UNITED STATES PATENT OFFICE.

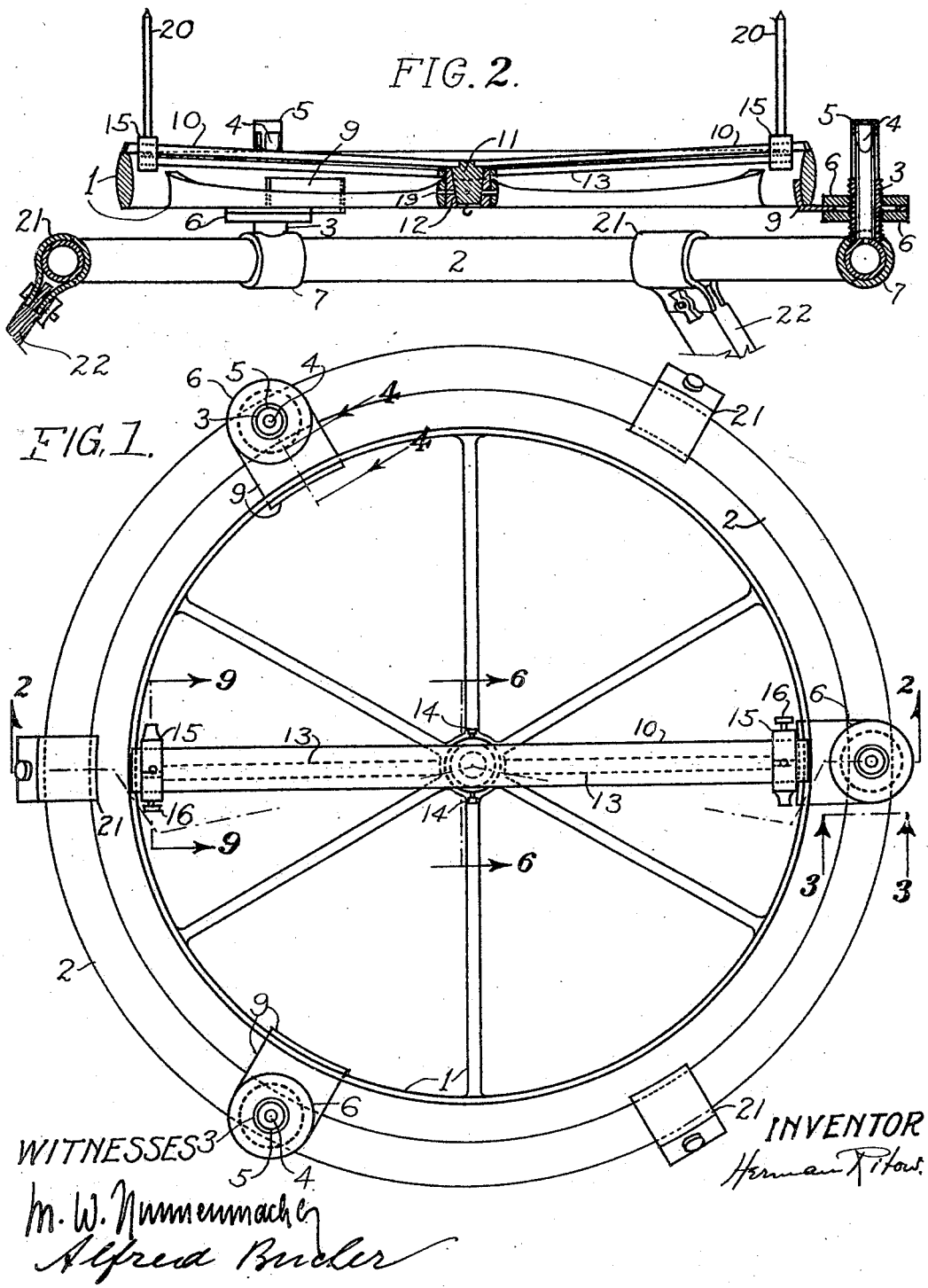

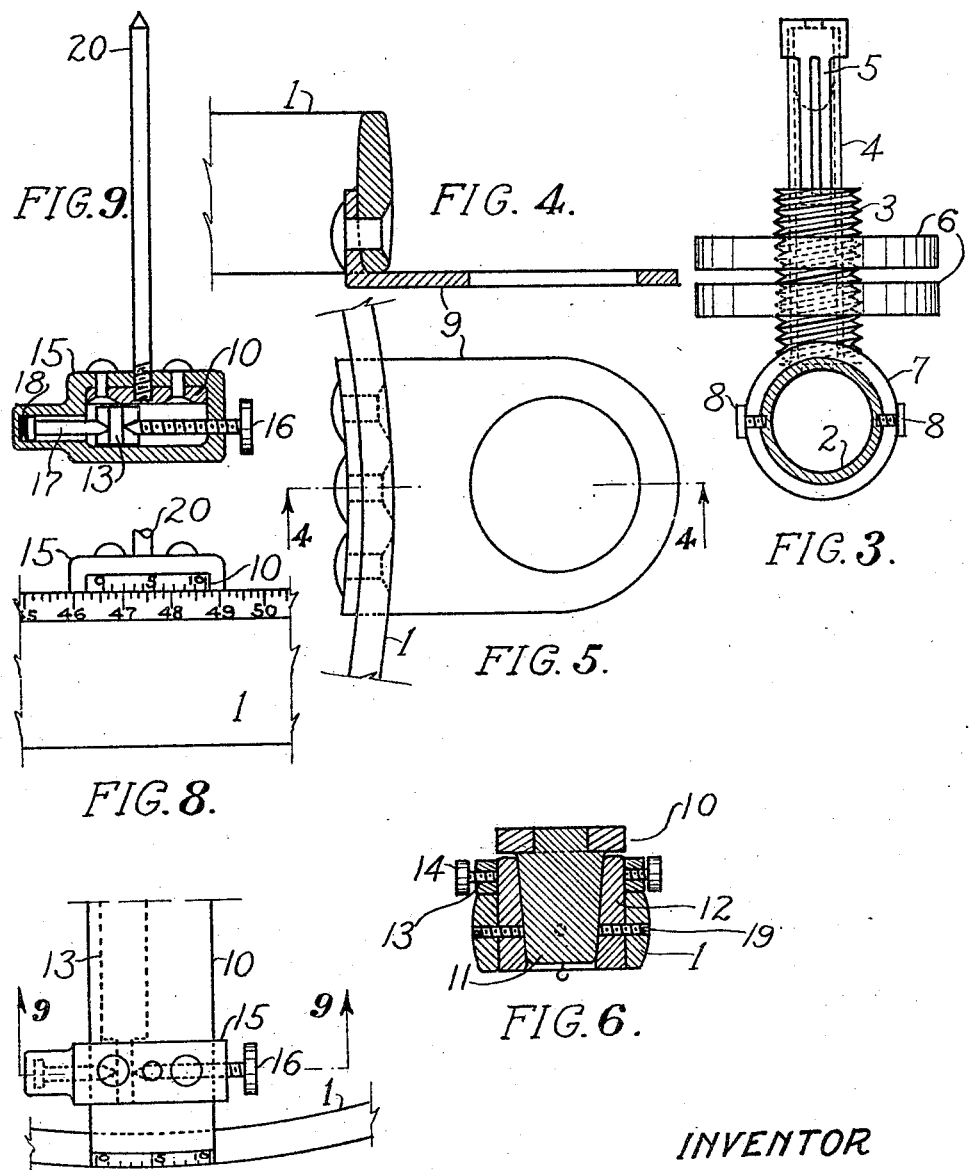

HERMAN RITOW, OF CHICAGO, ILLINOIS.

LEVELING INSTRUMENT.

1,410,958.  Specification of Letters Patent.  Patented Mar. 28, 1922.

Application filed August 22, 1921. Serial No. 494,170.

*To all whom it may concern:*

Be it known that I, HERMAN RITOW, a citizen of the United States, and a resident of Chicago, in the county of Cook and State of Illinois, have invented certain new and useful Improvements in Leveling Instruments, of which the following is a specification, reference being had to the accompanying drawings.

This invention relates to improvements in that class of surveying instruments that are used to establish points of equal height or level. It is the object of the invention to provide an instrument for this purpose that will be cheap to manufacture, simple in construction, and easy of operation by ordinary mechanics. While not primarily designed for uses where a high degree of accuracy is required, the apparatus embodying my invention is one that will greatly simplify the operations attendant upon the taking of levels in many situations, and will obviate many of the errors of adjustment of such instruments when the same are in the hands of the average mechanic.

I attain the object specified by the construction and arrangement of parts shown in the drawings and hereinafter particularly described. That which I believe to be novel will be pointed out in the claims.

In the drawings,—

Fig. 1 is a top or plan view of an apparatus embodying my invention;

Fig. 2 is a vertical section taken at line 2—2 of Fig. 1;

Fig. 3 is an enlarged detail, being a vertical section taken at line 3—3 of Fig. 1 through the main liquid containing chamber and showing in elevation one of the vertical liquid-containing tubes and certain parts connected therewith;

Fig. 4 is an enlarged detail being a vertical section taken at the line 4—4 of Fig. 1 and illustrating one of the ears connected with and projecting from the main liquid-containing chamber;

Fig. 5 is a plan view of the parts shown in Fig. 4;

Fig. 6 is an enlarged detail being a vertical section taken on the line 6—6 of Fig. 1;

Fig. 7 is an enlarged detail, being a plan view of one of the end portions of the vernier bar and parts connected therewith;

Fig. 8 is a view in elevation of the parts shown in Fig. 7; and

Fig. 9 is an enlarged detail, being a vertical section taken on the line 9—9 of Fig. 1 through the vernier bar and certain parts connected therewith.

Referring to the several figures of the drawings,—1 indicates a sighting member, the upper surface of which is to be as near a perfect plane as possible, inasmuch as the sighting by the user is across such surface from a point at one edge thereof to another point on the edge. The sighting member, in the construction shown, is in the form of a wheel, and for convenience will hereinafter be referred to as a wheel. The rim, spokes and hub of the wheel are preferably formed integral with each other. The wheel 1 is supported by and above a water container 2 which, in the construction shown, is in the form of an annular tube, and of somewhat greater diameter than the wheel 1. The wheel 1 is supported from the annular tube 2 at three points equidistant from each other, and at each point of support the connection of the two parts is made through a sleeve 7 surrounding the tube 2 and suitably secured thereto, into the upper surface of which is screwed a holder 3 in which is mounted a glass tube 4 that, as shown, rises to some distance above the upper end of the holder 3. Projecting from the wheel 1 is an ear 9 having a horizontal portion with an opening therein, through which opening the holder 3 projects. The opening in the ear is of considerably greater diameter than the diameter of the holder that goes through it, which is for the purpose of permitting the wheel 1 to be adjusted horizontally for a purpose hereinafter set forth. Screwed upon the holder are two nuts 6, one above and one below the ear 9, and it is evident that by a turning of these nuts the wheel can be adjusted up or down as desired, and when in the required position can be firmly held by tightening such nuts against the ear. It is evident that by severally adjusting the nuts at the three points of support referred to the wheel 1 can be brought into position to have its upper plane surface horizontal, and thereby be adapted for sighting purposes, as stated.

The horizontality of the upper surface of the sighting wheel 1 is determined by the fact that the sighting plane of said wheel 1 appears in a direct line with the meniscus or slightly curved surface of the column of liquid in each glass tube 4. It is after this has been determined that the two screws on each of the holders are tightened, so that thereafter the wheel 1 will be held firmly in place. Preliminary to this accurate adjustment of the wheel the operator will, of course, bring the device as a whole into such position that the members 1 and 2 are approximately horizontal, and this he will do by adjustment of the three legs 22 which are suitably connected with the tube 2 through the medium of clamping devices 21 secured thereon at points equally spaced.

Each of the glass tubes 4 is, of course, open at its upper end to the atmosphere, and through one of these open ends the required amount of liquid may be supplied to the tube 2 and the tubes 4 that rise therefrom. Around that portion of each tube 4 that extends above its holder 3, I provide a protector 5 which will be cut away sufficiently, of course, to permit the liquid rising in such tube to be plainly viewed.

The instrument comprises a vernier device to adapt it for the measuring of horizontal angles, which device comprises a vernier bar 10 extending across the wheel or sighting member 1, which bar is pivoted centrally of such member 1. In order to accurately secure a pivoting of such bar 10 so that the axis of rotation of the vernier is made exactly at right angles to the sight plane of the wheel 1, I provide in the hub member of the wheel a bushing 12 which may be secured to said hub member by screws 19 or otherwise. The inner face of this bushing is tapered downward, and within it accurately fits a pivot 11, upon a reduced upper end portion of which is secured in any suitable manner the central portion of said vernier bar 10. The vernier bar differs in no material respects from other verniers, other than that while its end portions overlie the edge portions of the upper face of the wheel 1, its central portion is depressed, as clearly shown in Fig. 2, below the plane of such upper portion—such depression being had so that no obstruction will be offered as the user sights along the plane of the member 1 when using it to establish levels. The vernier bar carries at each of its ends an ordinary tangent screw member 15 in the form of a shell or case, as shown in Fig. 9, into which projects at one end a clamping rod 13 which differs from the ordinary construction only in that it, like the bar 10, is centrally depressed for the same reason that the bar 10 is so depressed. Each end of the clamping rod 13 that projects into the adjacent member 15 is held between a tangent screw 16 and a spring-pressed rod 17, as usual, the turning of the tangent screw 16 permitting the fine adjustments necessary after an approximately correct adjustment of the vernier device has been made as usual. This rod 13 is provided centrally with an eye as shown in Fig. 6 that fits over the bushing 12, and rests upon the hub member of the wheel 1, and it is held in any desired adjusted position by one or more set screws 14 as shown. The wheel 1 and the vernier bar 10 will be provided with the usual graduations marked thereon, as will be understood.

The use of the instrument for establishing points of equal height or level has been in part described in connection with the statement of the construction of the apparatus, but briefly is as follows:—With the required amount of liquid in the tube 2 and the three tubes 4 that rise therefrom and communicate therewith, the operator will bring the tube 2 to an approximately horizontal position by an adjustment of the supporting tripod legs 22. Thereafter by a successive turning of the nuts 6 to cause a raising or lowering of the respective ears 9 the wheel 1 will be moved until the surface of the column of liquid in each tube 3 appears to be exactly in line with the plane upper surface of the wheel. When that has been accomplished it is evident that the sighting plane must, of course, be level, and thereafter the operator will sight along said plane upper surface from one edge thereof to the other, and by the aid of a helper, stationed at the desired distant point, as usual, will be able to mark a point that appears exactly in the plane of the upper surface of the wheel. In this operation the vernier mechanism, by reason of being depressed to quite a portion of its length below the sighting plane of the wheel, will offer no obstruction to the sighting, although if for any reason it be desired to remove the vernier device, such removal can be easily and quickly effected by simply loosening the set screws 14, and pulling the pivot member 11 out of the bushing 12.

When the instrument is used for the measuring of horizontal angles, it is to be set up as hereinbefore described, and with the vertical axis of the wheel as nearly over the point at which the angle is to be measured as can be judged by the eye of the operator, and then with a plumb-bob suspended from a hook in the lower end of the pivot 11 the wheel 1 is to be shifted laterally until such plumb-bob is directly over the desired point. This lateral shifting of the wheel is permitted by a loosening of the several nuts 6 and the large size of the openings in the ears 9. After the desired lateral adjustment has been made, the various nuts 6 will, of course, be tightened. The required measurements by the use of the vernier are then taken in exactly the same manner as is customary with ordinary transits. Each end of the vernier member will be provided with two vertical sights 20, as usual.

With the upper surface of the wheel 1 as near a perfect plane as can be produced, and with the axis of the inner face of the bushing 12 as nearly at right angles to the sighting plane as possible, the instrument will be found to be one that is not only cheap to construct and easy to operate, but one that will permit of very accurate operations. The accuracy of the level will then depend only upon the sharpness of the operator's eyesight, and, of course, to some extent on the diameter of the sighting wheel, for the greater such diameter the greater are the chances for accuracy in results.

While I have described the particular form and construction of a sighting member 1 and water containing member 2, it is to be understood that while such forms and constructions are particularly well adapted for the carrying out of my invention, I do not restrict myself thereto except as the same may be specified in some of the claims.

What I claim as my invention and desire to secure by Letters Patent, is—

1. An instrument of the class described comprising in combination a sighting member having a plane upper surface, a liquid-containing chamber, a plurality of transparent tubes communicating with said chamber and rising therefrom adjacent to the perimeter of said sighting member, and means for adjusting said sighting member to bring the said plane surface thereof on a level with the surface of the columns of liquid in said tubes.

2. An instrument of the class described comprising in combination a sighting member having a plane upper surface, a liquid-containing chamber, a plurality of transparent tubes communicating with said chamber and rising therefrom adjacent to the perimeter of said sighting member, and means adjustably connected with said tubes and also connected with said sighting member adapted to bring the said plane surface of such member on a level with the surface of the columns of liquid in said tubes.

3. An instrument of the class described comprising in combination a sighting member having a plane upper surface, a liquid-containing chamber, a plurality of transparent tubes communicating with said chamber and rising therefrom adjacent to the perimeter of said sighting member, means for adjusting said sighting member to bring the said plane surface thereof on a level with the surface of the columns of liquid in said tubes, and means for locking said sighting member in place.

4. An instrument of the class described comprising in combination a sighting member having a plane upper surface, a liquid-containing chamber, a plurality of tubes communicating therewith and rising therefrom, a screw-threaded sleeve surrounding each tube and secured to the wall of said chamber, a nut rotatable on each holder and a plurality of ears connected with said sighting member and resting upon said nuts, respectively, whereby the sighting member may be adjusted to bring the said plane surface thereof on a level with the surface of the columns of liquid in said tubes.

5. An instrument of the class described comprising in combination a sighting member having a plane upper surface, a liquid-containing chamber, a plurality of tubes communicating therewith and rising therefrom, a screw-threaded sleeve surrounding each tube and secured to the wall of said chamber, a pair of nuts rotatable on each holder, and a plurality of ears connected with said sighting member and projecting between said pairs of ears, respectively, whereby the sighting member may be adjusted and locked in position with its said plane surface on a level with the surface of the columns of liquid in said tubes.

6. An instrument of the class described comprising in combination a liquid-containing chamber formed of a tube bent into annular form, a plurality of transparent tubes communicating therewith and rising therefrom and spaced at equal distances apart, a circular sighting member having a plane upper surface, the perimeter of said sighting member being in proximity to said transparent tubes, and means for adjusting said sighting member to bring the said plane surface thereof on a level with the surface of the columns of liquid in said transparent tubes.

7. An instrument of the class described comprising in combination a liquid-containing chamber formed of a tube bent into annular form, a plurality of transparent tubes communicating therewith and rising therefrom and spaced at equal distances apart, a circular sighting member having a plane upper surface, the perimeter of said sighting member being in proximity to said transparent tubes, and means surrounding each of said transparent tubes and independently adjustable and connected with said sighting member for moving said member to bring its said plane surface on a level with the surface of the columns of liquid in said transparent tubes.

8. An instrument of the class described comprising in combination a liquid-containing chamber formed of a tube bent into annular form, a plurality of transparent tubes communicating therewith and rising therefrom and spaced at equal distances apart, an annular sighting body located above the plane occupied by said annular tube and having its periphery adjacent to said transparent tubes, said sighting body having a plane upper surface, and means for adjustably connecting said annular tube and sighting body to allow said plane surface of the sighting body to be brought on a level with the surface of the columns of liquid in said transparent tubes.

9. An instrument of the class described comprising in combination a liquid-containing chamber formed of a tube bent into annular form, a plurality of transparent tubes communicating therewith and rising therefrom and spaced at equal distances apart, an annular sighting body located above the plane occupied by said annular tube and having its periphery adjacent to said transparent tubes, said sighting body having a plane upper surface, and a plurality of supporting means for the sighting body connected respectively with the said annular tube, said supporting means being vertically movable to bring said plane surface of the sighting body on a level with the surface of the columns of liquid in said tubes.

10. An instrument of the class described comprising in combination a liquid-containing chamber, a plurality of transparent tubes communicating therewith and rising therefrom, a wheel-shaped sighting member having a plane upper surface, means for adjusting said sighting member relatively to the said chamber to bring the said plane surface on a level with the surface of the columns of liquid in said tubes, and a vernier device extending across the sighting member and pivotally mounted on a vertical axis in the hub of said member, an end portion of the vernier device overlying the rim of said sighting member.

11. An instrument of the class described comprising in combination a liquid-containing chamber, a plurality of transparent tubes communicating therewith and rising therefrom, a wheel-shaped sighting member having a plane upper surface, means for adjusting said sighting member relatively to the said chamber to bring the said plane surface on a level with the surface of the columns of liquid in said tubes, and a vernier device extending across the sighting member and pivotally mounted on a vertical axis in the hub of said member, an end portion of the vernier device overlying the rim of said sighting member, and a portion of the length of said vernier device lying below the plane of the upper surface of the sighting member.

12. An instrument of the class described comprising in combination a liquid-containing chamber, a plurality of transparent tubes communicating therewith and rising therefrom, a wheel-shaped sighting member having a plane upper surface, means for adjusting said sighting member relatively to the said chamber to bring the said plane surface on a level with the surface of the columns of liquid in said tubes, a vernier device extending across the sighting member and pivotally mounted on a vertical axis in the hub of said member, said sighting member being laterally adjustable to bring its vertical axis directly over a given point, and means for locking said sighting member against movement after it has been given both of the said adjustments.

13. An instrument of the class described comprising in combination a liquid-containing chamber, a plurality of transparent tubes communicating therewith and rising therefrom, a wheel-shaped sighting member having a plane upper surface, an ear surrounding each of said tubes, the opening in each ear being sufficiently large to permit of a lateral bodily adjustment of the sighting member to carry its vertical axis directly over a predetermined point, means for separately adjusting said ears vertically to bring the said plane surface of the sighting member on a level with the surface of the columns of liquid in said tubes, means for locking said ears against movement, and a vernier member pivoted on a vertical axis in the hub of said sighting member.

14. In an instrument of the class described the combination of a wheel-shaped sighting member having a plane upper surface, a pivot member mounted in the hub of said wheel-shaped sighting member with the axis thereof at right angles to the said plane surface of the sighting member, a vernier device connected with said pivot member and overlying the said plane surface of the sighting member, and means for bringing the said plane surface to a horizontal position.

15. In an instrument of the class described the combination of a wheel-shaped sighting member having a plane upper surface, a pivot member mounted in the hub of said wheel-shaped sighting member with the axis thereof at right angles to the said plane surface of the sighting member, a vernier device connected with said pivot member and overlying the said plane surface of the sighting member, and means comprising a plurality of vertical water columns disposed adjacent the rim of the sighting member for determining the horizontality of said plane surface.

16. In an instrument of the class described the combination of a wheel-shaped sighting member having a plane upper surface, a pivot member mounted in the hub of said wheel-shaped sighting member with the axis thereof at right angles to the said plane surface of the sighting member, a vernier device connected with said pivot member and overlying the said plane surface of the sighting member, said vernier device for a portion of its length being depressed below the said plane upper surface of the sighting member, and means comprising a plurality of vertical water columns disposed adjacent the rim of the sighting member for determining the horizontality of said plane surface.

17. In an instrument of the class described the combination of a wheel-shaped sighting member having a plane upper surface, a bushing seated in the hub portion of said sighting member, a pivot member mounted in said bushing with the axis thereof at right angles to the said plane surface of the sighting member, a vernier device connected with said pivot member and overlying the said plane surface of the sighting member, and means for bringing the said plane surface to a horizontal position.

18. In an instrument of the class described the combination of a wheel-shaped sighting member having a plane upper surface, a bushing seated in the hub portion of said sighting member, a pivot member mounted in said bushing with the axis thereof at right angles to the said plane surface of the sighting member, a vernier device connected with said pivot member and overlying the said plane surface of the sighting member, and means for bringing the said plane surface to a horizontal position, said sighting member being laterally adjustable in all directions to bring the axis of said pivot member over a predetermined point.

HERMAN RITOW.